(12) United States Patent
Middlebrook

(10) Patent No.: US 10,642,288 B2
(45) Date of Patent: May 5, 2020

(54) PRESSURE RELIEF VALVE APPARATUS, SYSTEM AND METHOD

(71) Applicant: Vortech Engineering, Inc., Oxnard, CA (US)

(72) Inventor: James Middlebrook, Santa Rosa Valley, CA (US)

(73) Assignee: Vortech Engineering, inc., Oxnard, CA (US)

(*) Notice: Subject to any disclaimer, the term of this patent is extended or adjusted under 35 U.S.C. 154(b) by 146 days.

(21) Appl. No.: 15/914,292

(22) Filed: Mar. 7, 2018

(65) Prior Publication Data

US 2019/0278309 A1 Sep. 12, 2019

(51) Int. Cl.
| | | |
|---|---|---|
| *F16K 31/04* | (2006.01) | |
| *G05D 16/20* | (2006.01) | |
| *F02B 33/44* | (2006.01) | |
| *F02B 33/36* | (2006.01) | |
| *F02D 23/00* | (2006.01) | |
| *F02B 33/38* | (2006.01) | |
| *F16K 17/168* | (2006.01) | |
| *F16K 31/126* | (2006.01) | |
| *E21B 34/12* | (2006.01) | |
| *F16K 31/44* | (2006.01) | |
| *F16K 31/122* | (2006.01) | |
| *F16K 3/26* | (2006.01) | |

(52) U.S. Cl.
CPC ......... *G05D 16/202* (2013.01); *F16K 31/047* (2013.01); *E21B 34/12* (2013.01); *F02B 33/36* (2013.01); *F02B 33/38* (2013.01); *F02B 33/44* (2013.01); *F02B 33/446* (2013.01); *F02D 23/00* (2013.01); *F16K 3/26* (2013.01); *F16K 17/168* (2013.01); *F16K 31/04* (2013.01); *F16K 31/122* (2013.01); *F16K 31/126* (2013.01); *F16K 31/44* (2013.01); *F16K 31/445* (2013.01); *Y10T 137/7834* (2015.04)

(58) Field of Classification Search
CPC ...... F16K 31/047; F16K 31/44; F16K 31/445; F16K 31/02; F16K 31/04; F16K 17/168; F16K 3/26; F16K 31/122; F16K 31/126; E21B 2034/007; E21B 34/12; Y10T 137/7834; F02B 33/38; F02B 33/44; F02B 33/446; F02B 33/36; F02D 23/00
USPC ...................... 123/564, 559.1, 559.2; 251/58
See application file for complete search history.

(56) References Cited

U.S. PATENT DOCUMENTS

| | | | | |
|---|---|---|---|---|
| 3,480,746 A * | 11/1969 | Fry | ......................... | F16K 31/02 200/47 |
| 3,552,713 A * | 1/1971 | Kleeberg | ............... | F16K 31/003 251/69 |
| 3,643,583 A * | 2/1972 | Fritz | ....................... | F16K 1/221 454/194 |

(Continued)

*Primary Examiner* — Matthew W Jellett
*Assistant Examiner* — Christopher D Ballman

(57) ABSTRACT

A pressure relief valve is provided. The pressure relief valve includes a hollow body having an inlet and an outlet, with the hollow body including at least one aperture extending through a surface of the hollow body. An actuator assembly is attached to the hollow body and a sleeve is slideably positioned about the hollow body, with the sleeve moveably attached to the actuator assembly. During operation, the actuator assembly moves the sleeve from a first position that covers the aperture to a second position that un-covers at least a portion of the aperture.

8 Claims, 13 Drawing Sheets

(56) References Cited

U.S. PATENT DOCUMENTS

| | | | | |
|---|---|---|---|---|
| 3,675,751 A * | 7/1972 | Fortner | ............... | F16H 35/10 192/150 |
| 3,695,300 A * | 10/1972 | Bradel | ............... | F16K 3/04 138/94.3 |
| 3,705,594 A * | 12/1972 | Placek | ............... | F16K 31/02 137/1 |
| 4,545,560 A * | 10/1985 | Marcadet | ............... | F16K 31/16 137/556 |
| 4,958,656 A * | 9/1990 | Patel | ............... | F16K 17/105 137/467 |
| 5,924,671 A * | 7/1999 | Baumann | ............... | F15B 15/066 251/285 |
| 6,076,799 A * | 6/2000 | Baumann | ............... | F16K 31/5282 251/285 |
| 6,334,460 B1 * | 1/2002 | Hem | ............... | G05D 16/0655 123/459 |
| 6,775,990 B2 * | 8/2004 | Swinford | ............... | F01D 17/105 251/305 |
| 7,373,915 B1 * | 5/2008 | Joniec | ............... | F02B 75/048 123/197.1 |
| 7,665,714 B2 * | 2/2010 | Stumbo | ............... | F16K 31/02 251/69 |
| 8,474,256 B2 * | 7/2013 | Kamen | ............... | F02G 1/043 60/525 |
| 8,613,198 B2 * | 12/2013 | Swinford | ............... | F01D 17/148 137/1 |
| 8,763,391 B2 * | 7/2014 | Kamen | ............... | F02G 1/043 60/525 |
| 8,881,762 B2 * | 11/2014 | Johnson | ............... | F02D 9/02 137/554 |
| 9,249,892 B2 * | 2/2016 | Klippert | ............... | H02K 7/10 |
| 9,435,455 B2 * | 9/2016 | Peret | ............... | F16K 31/02 |
| 9,476,282 B2 * | 10/2016 | Anton | ............... | E21B 34/063 |
| 2008/0302538 A1 * | 12/2008 | Hofman | ............... | E21B 43/00 166/373 |
| 2011/0146601 A1 * | 6/2011 | Fisher | ............... | F01B 9/047 123/62 |
| 2012/0111574 A1 * | 5/2012 | Desranleau | ............... | E21B 34/14 166/373 |
| 2016/0003005 A1 * | 1/2016 | Pickle | ............... | E21B 34/10 166/374 |
| 2016/0061370 A1 * | 3/2016 | Gennasio | ............... | F16L 37/34 251/58 |
| 2016/0084434 A1 * | 3/2016 | Janway | ............... | A61M 5/16813 361/601 |

* cited by examiner

PRESSURE RELIEF VALVE APPARATUS, SYSTEM AND METHOD

FIELD OF THE INVENTION

The present invention relates generally to valves, and more particularly to dump valves, pressure relief valves and other types of valves.

BACKGROUND OF THE INVENTION

At their most basic, a valve controls the flow of a fluid or gas. Valves are integral components in almost every gas or fluid system. A pressure relief valve is a type of valve used to control or limit the pressure in a system. The pressure is relieved by allowing the pressurized fluid to flow through the valve and out of the system. Often, this type of valve is designed to open at a predetermined pressure to protect equipment from being subjected to pressures that exceed their design limits. When the set pressure is exceeded, the relief valve becomes the "path of least resistance" as the valve is forced open and the fluid or gas is allowed to escape. As the fluid or gas escapes, the pressure in the system decreases. Once it reaches the valve's reseating pressure, the valve will close.

However, in most systems that use moving parts, there are problems specific to the part. Common valve problems include noise, vibration, reverse flow, sticking, leakage, component wear, or damage. In addition, valves are subject to wear—whenever one part rubs against another part, wear is a result, which leads to leakage and eventual failure of one or more components. A component failure can result in the valve not performing its function, which in the case of a pressure relief valve, preventing system overpressure.

Therefore, there remains a need to overcome one or more of the limitations in the above-described, existing art. The discussion of the background to the invention included herein is included to explain the context of the invention. This is not to be taken as an admission that any of the material referred to was published, known or part of the common general knowledge as at the priority date of the claims.

Figure 1:
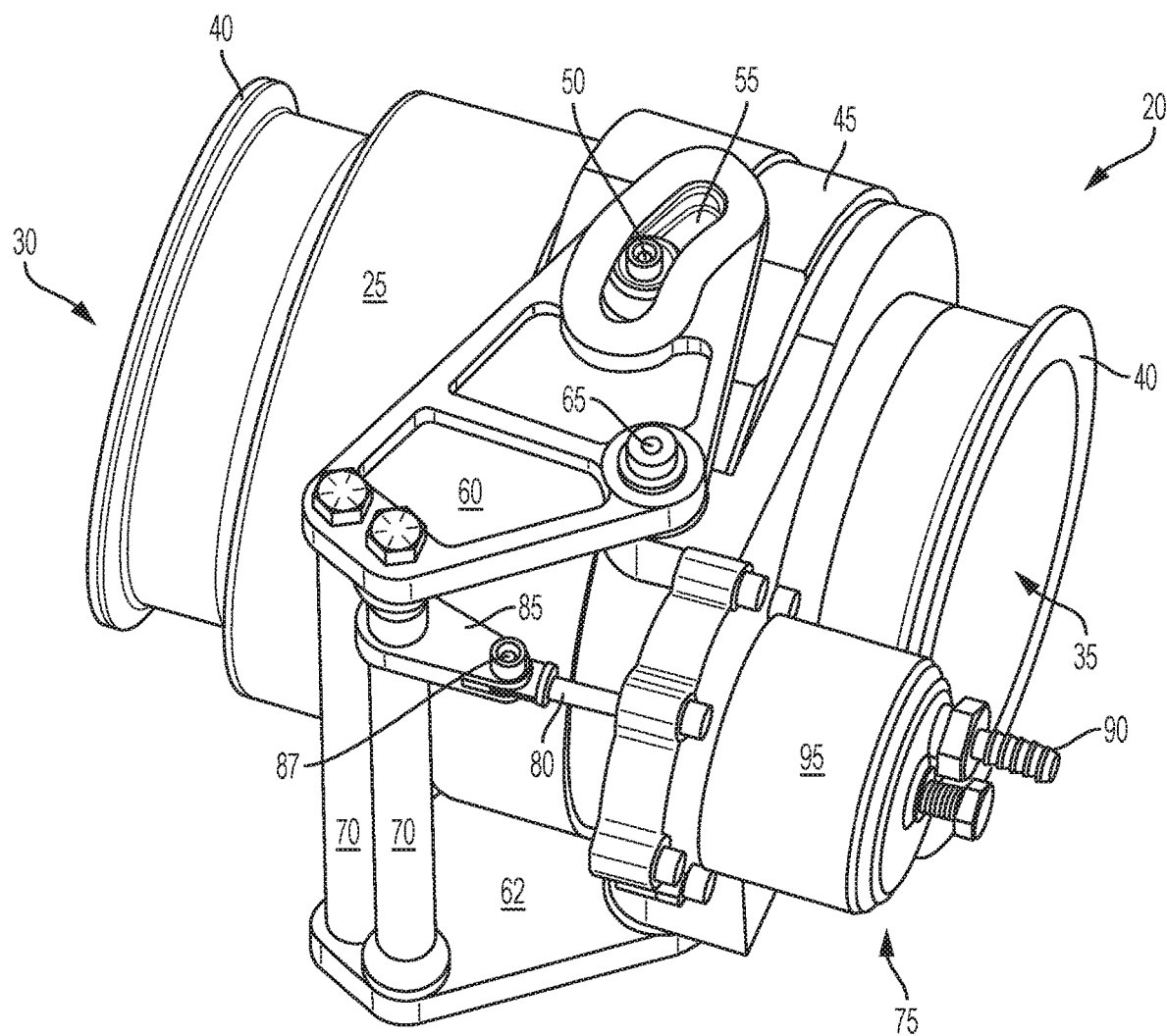
FIG. 1 is a perspective view of one embodiment of a pressure relief valve embodying the principals of the invention, with the valve in the closed position.
Figure 2:
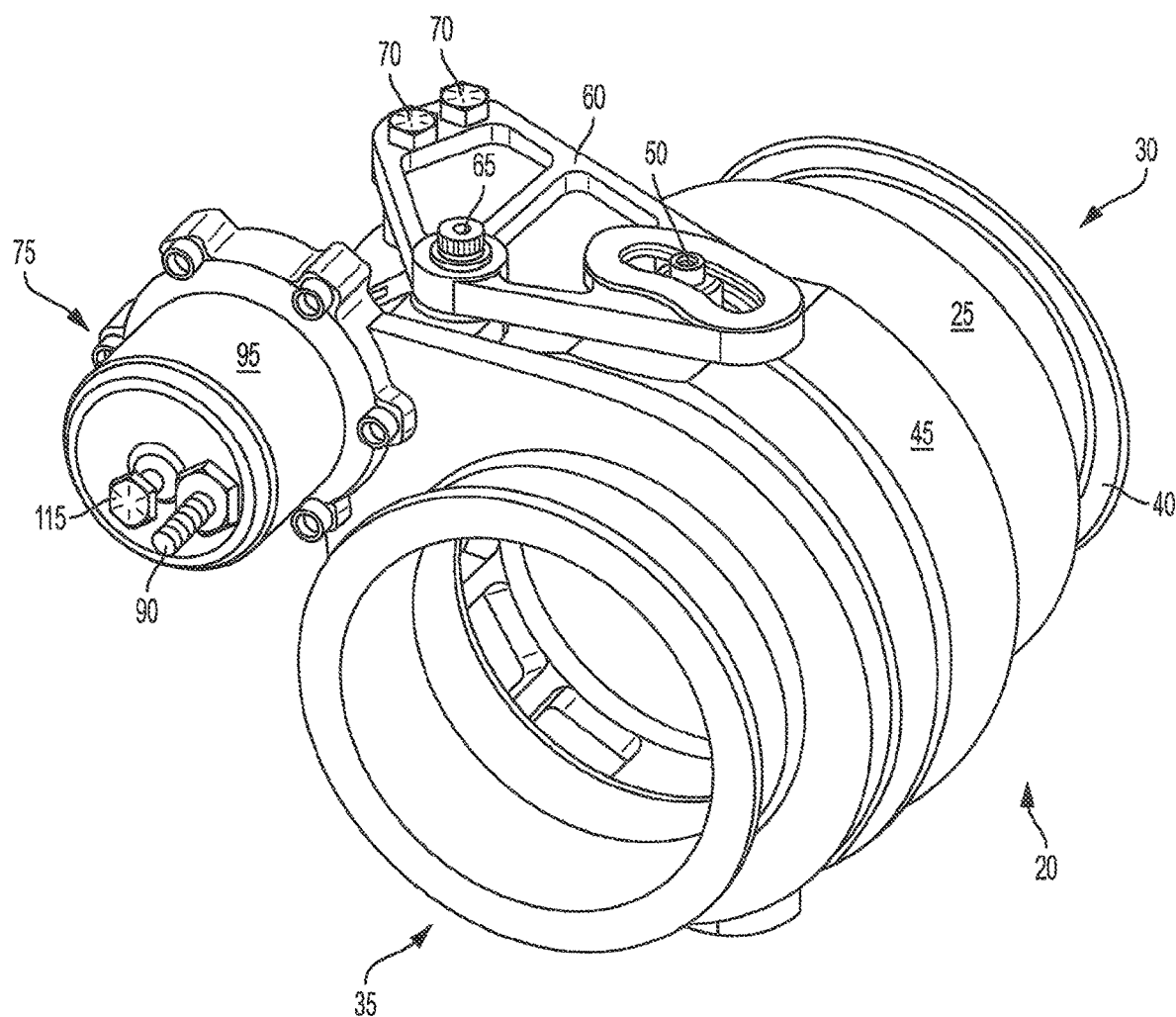
FIG. 2 is another perspective view of the pressure relief valve illustrated in FIG. 1, also with the valve in the closed position.
Figure 3:
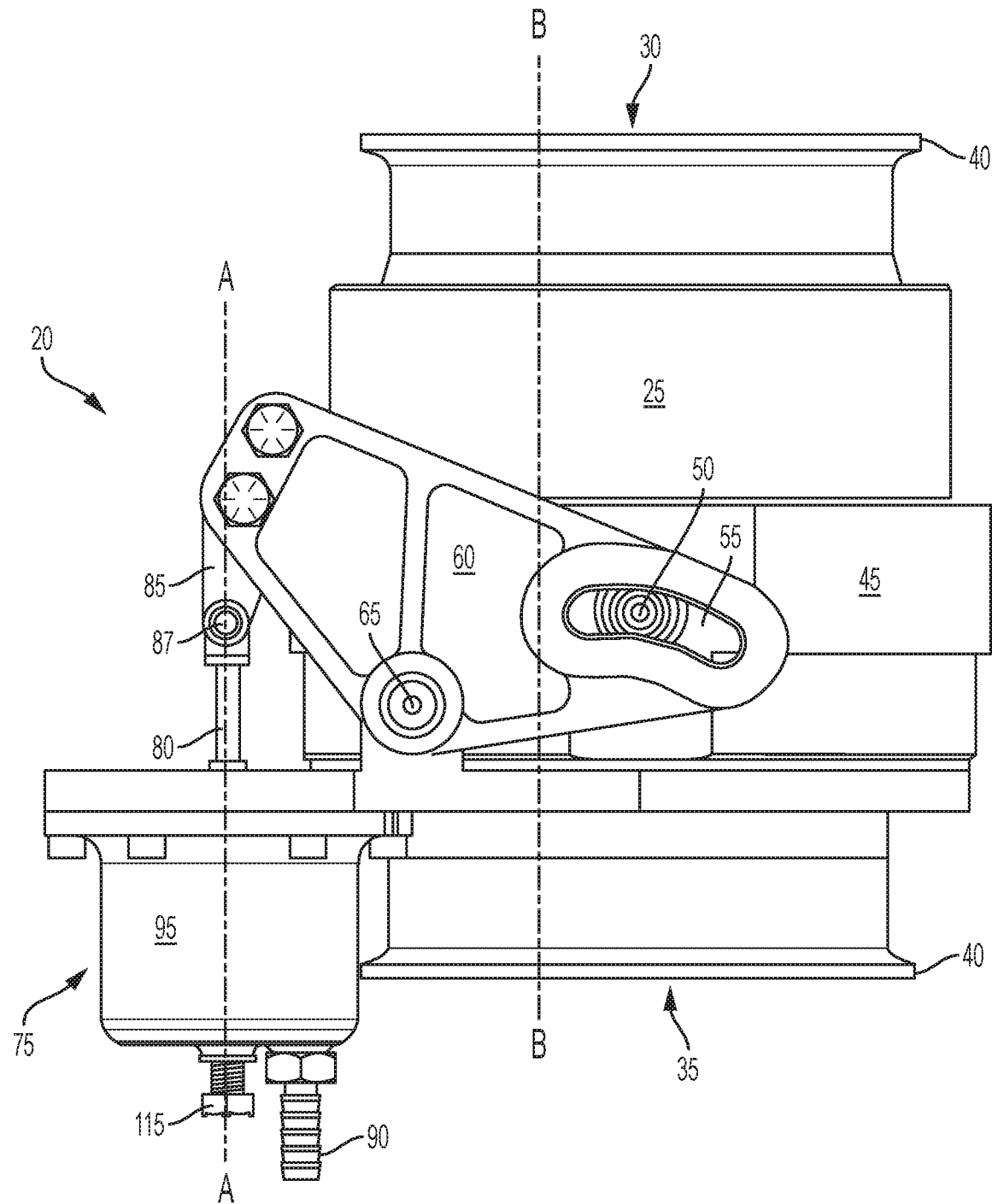
FIG. 3 is a top plan view of the embodiment of FIG. 1, with the valve in the closed position.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

In the following description, for the purposes of explanation, numerous specific details are set forth in order to provide a thorough understanding of the pressure relief valve apparatus and system ("PRV") that embodies principals of the present invention. It will be apparent, however, to one skilled in the art that the pressure relief valve apparatus and system may be practiced without some of these specific details. Throughout this description, the embodiments and examples shown should be considered as exemplars, rather than as limitations on the pressure relief valve apparatus and system. That is, the following description provides examples, and the accompanying drawings show various examples for the purposes of illustration. However, these examples should not be construed in a limiting sense as they are merely intended to provide examples of the pressure relief valve apparatus and system rather than to provide an exhaustive list of all possible implementations of the pressure valve apparatus and system.

Specific embodiments of the pressure valve apparatus and system invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

The present invention comprises a pressure relief valve ("PRV"), and in one embodiment comprises an intake manifold vacuum-actuated valve designed to release pressure in the intake system of a supercharged or turbocharged engine when the throttle is lifted or closed. Generally, in an internal-combustion engine, air is compressed by a supercharger or turbocharger, (hereinafter generically referred to as "compressor"), and then routed to an intake manifold on the engine. Between the compressor and the intake manifold is a throttle body that controls the amount of compressed air going from the compressor to the intake manifold. When the throttle body is closed the compressed air is trapped and a pressure wave is forced back toward the compressor (i.e., "compressor surge"). This adds stress on the bearings and shaft of the compressor, which can potentially break components in the compressor.

The pressure relief valve (PRV) of the present invention is used to prevent compressor surge by providing pressure relief. The PRV is located between the compressor and the throttle body. In one embodiment, the PRV is connected by a vacuum hose to the intake manifold. When the throttle body is closed, the relative intake manifold pressure drops below atmospheric pressure and the resulting pressure drop, or vacuum, operates the PRV, which opens and allows air trapped between the compressor and throttle body to escape to the atmosphere, thereby preventing compressor surge. Alternatively, the air can be recirculated into the engine's air intake upstream of the compressor inlet.

It will be appreciated that the PRV of the present invention may have applications other than internal-combustion engines. Also, as defined herein, "fluid" refers to fluid in the form of a gas, such as air from the atmosphere, or isolated gasses, such as hydrogen, helium, carbon dioxide or other gasses. The PRV may be employed in any fluid system.

Referring now to FIGS. 1-13, a pressure valve apparatus (PVT) or system 20 is illustrated. A hollow housing, or body 25 includes a fluid inlet 30 and a fluid outlet 35, and one or more apertures 27. In the illustrated embodiment, the body 25 has a circular cross-section, but it will be appreciated that an oval, elliptical or other cross-section may be employed. Both the inlet 30 and outlet 35 include mounting flange 40 to enable coupling to pipes, or tubes of an internal-combustion engine.

As shown in the figures, a sleeve, or jacket 45 is slideably positioned about the hollow body 25. For example, in an embodiment having a cylindrical hollow body 25, the sleeve 45 would also be cylindrical. As discussed above, other shapes for the body 25 and sleeve 45 may be employed. The sleeve 45 includes a pin 50 extending from the sleeve 45 into a slot 55 that is included in a pivot plate 60. In one embodiment, the pin 50 comprises a fastener that secures a ball bearing that slides or rotates in slot 55.

Illustrated in the figures, the pivot plate 60 is rotatably coupled to the hollow body 25 at pivot point 65. This is accomplished through conventional fastening means such as a bolt and a cylindrical bushing that allow the pivot plate 60 to rotate relative to the hollow body 25.

As shown in FIGS. 1, 4-5 and 9, the PVT 20 includes a second pivot plate 62 located opposite the first pivot plate 60. The pivot plates 60 and 62 are mirror images, that is, the design of the second pivot plate 62 is reversed relative to the first pivot plate 60, but the second pivot plate 62 includes all the elements of the first pivot plate 60. For example, pivot plate 62 is identical to pivot plate 60 in that pivot plate 62 is rotatably coupled to the hollow body 25 at a second pivot point 67. A second pin 52 extending from the sleeve 45 is located in slot 57 of the second pivot plate 62. And, the second pivot plate 62 is pivotably attached to the hollow body 25 by conventional fastening means such as a bolt and a cylindrical bushing that allow the second pivot plate 62 to rotate relative to the hollow body 25. In one embodiment, the pin 52 comprises a fastener that secures a ball bearing that slides or rotates in slot 57.

Figure 4:
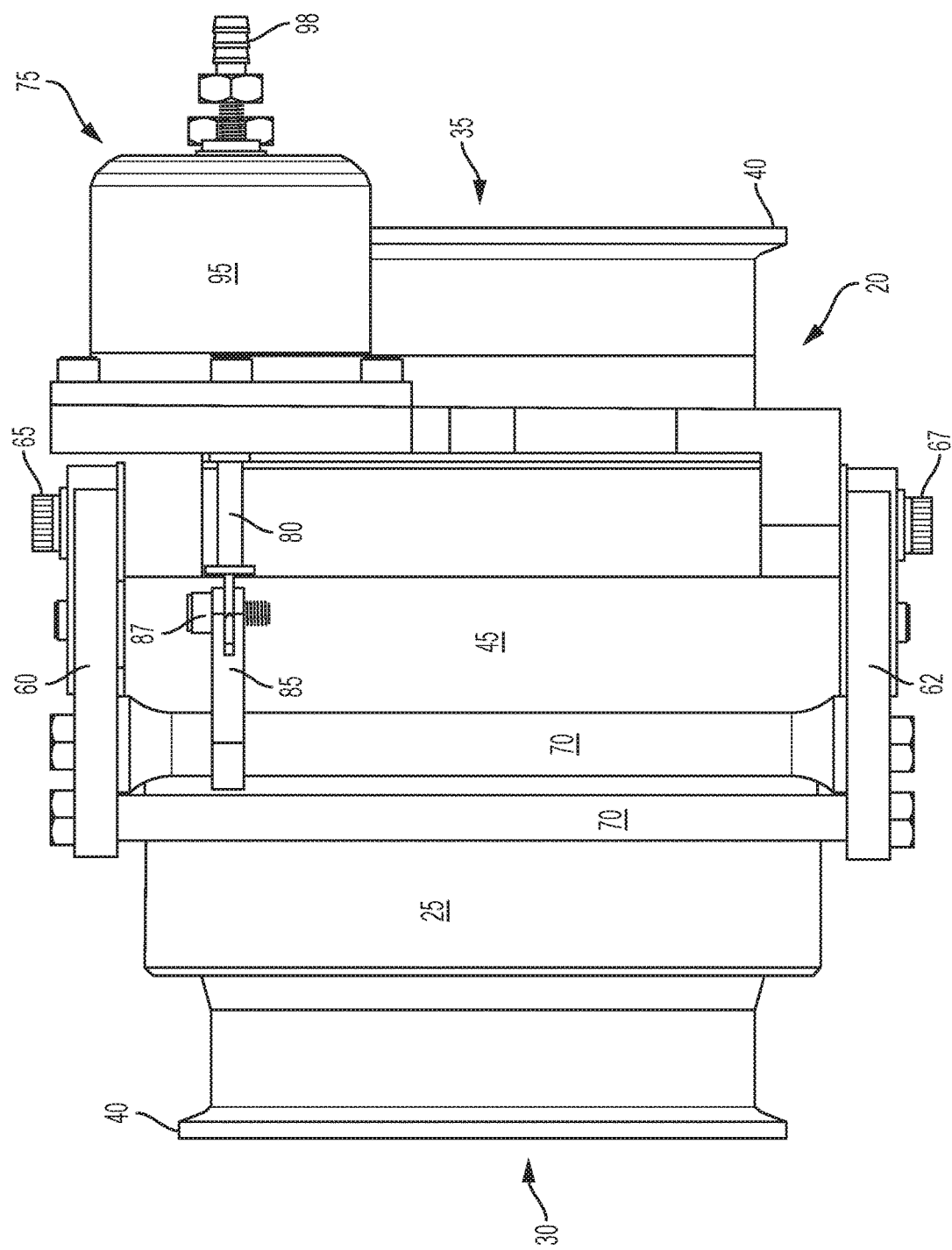
FIG. 4 is a side elevation view of the embodiment of FIG. 1, with the valve in the closed position.
Figure 5:
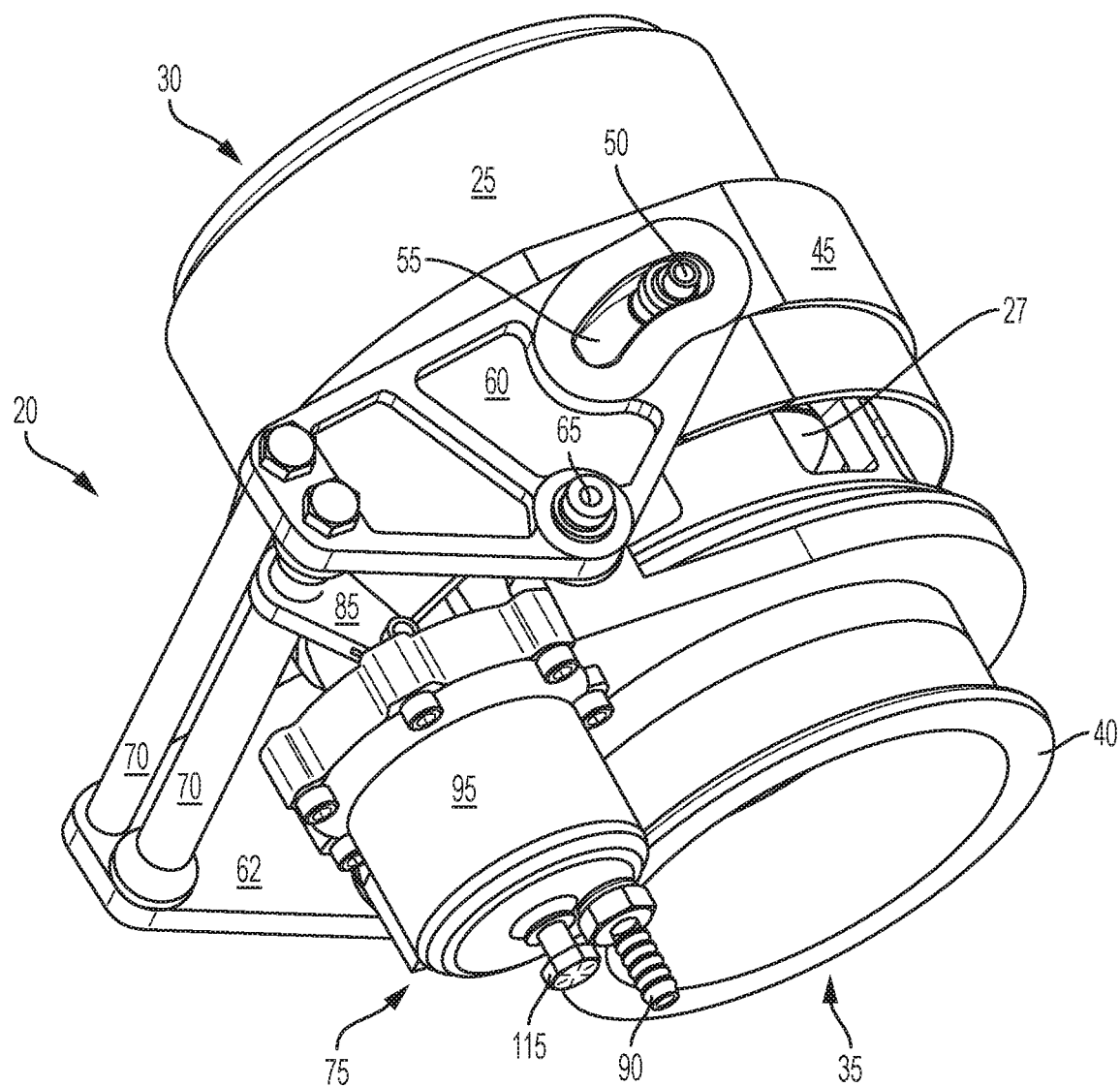
FIG. 5 is a perspective view of the embodiment of FIG. 1, with the valve in the open position.
Figure 6:
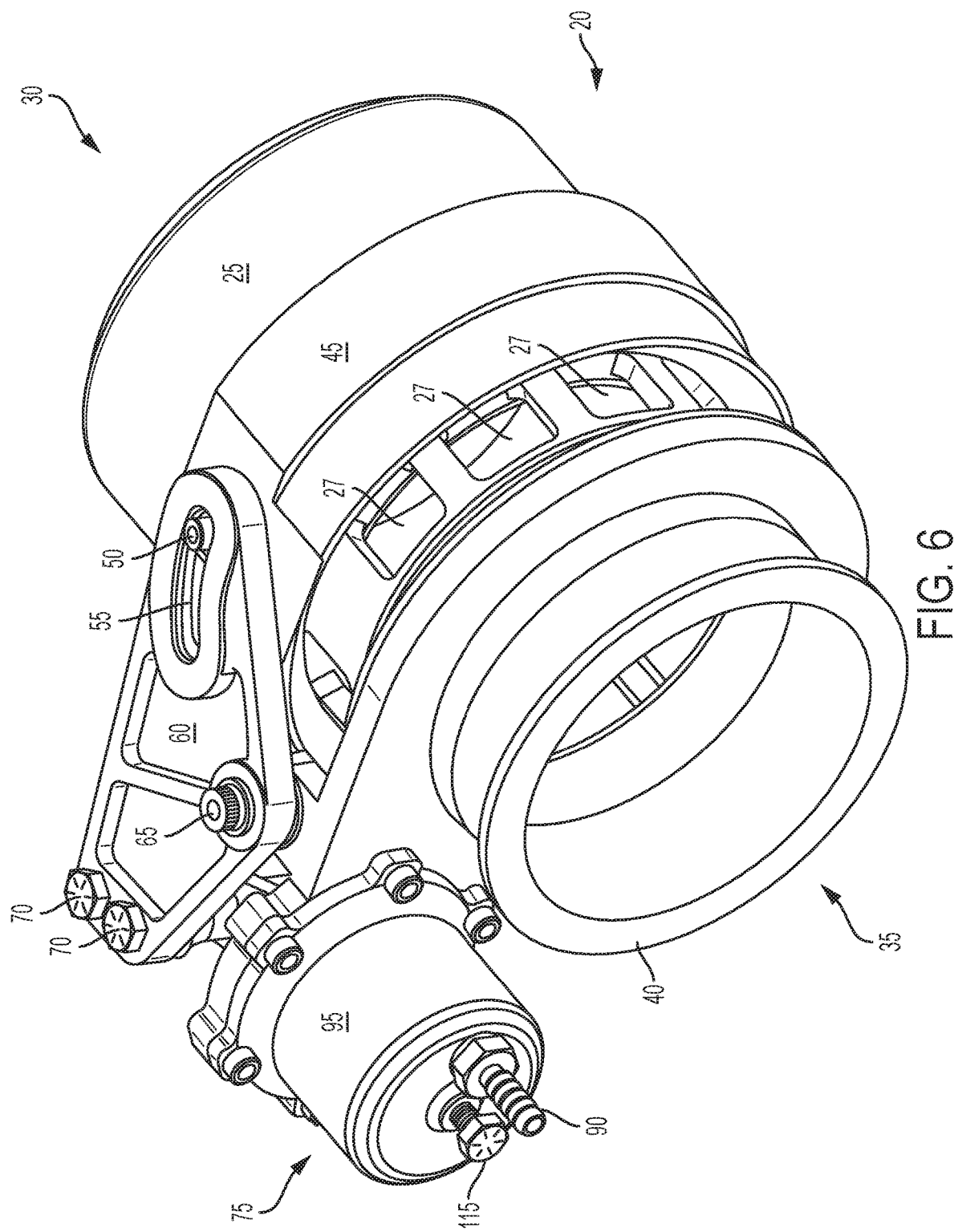
FIG. 6 is another perspective view of the pressure relief valve illustrated in FIG. 1, also with the valve in the open position.
Figure 7:
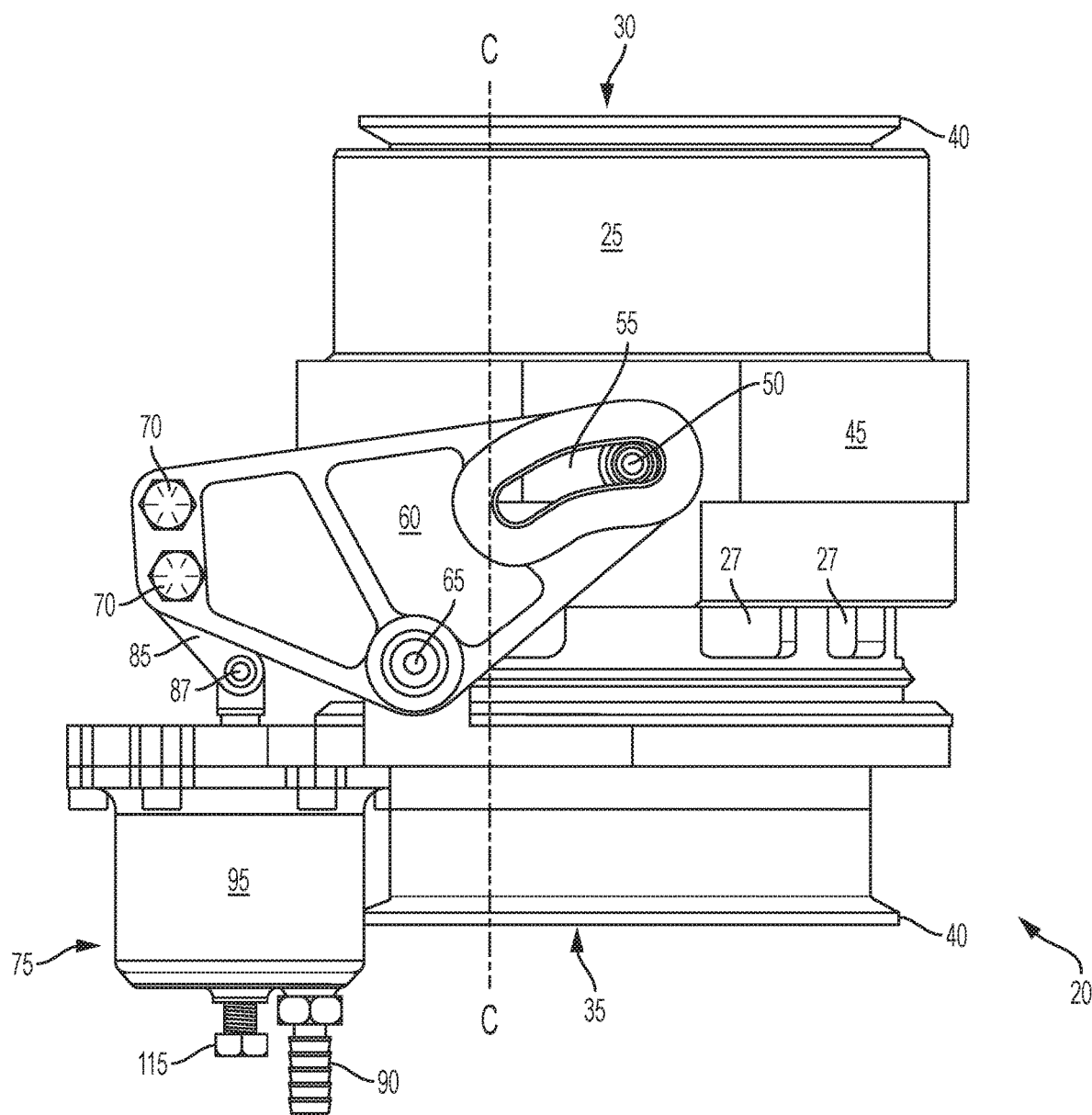
FIG. 7 is a top plan view of the embodiment of FIG. 1, with the valve in the open position.
Figure 8:
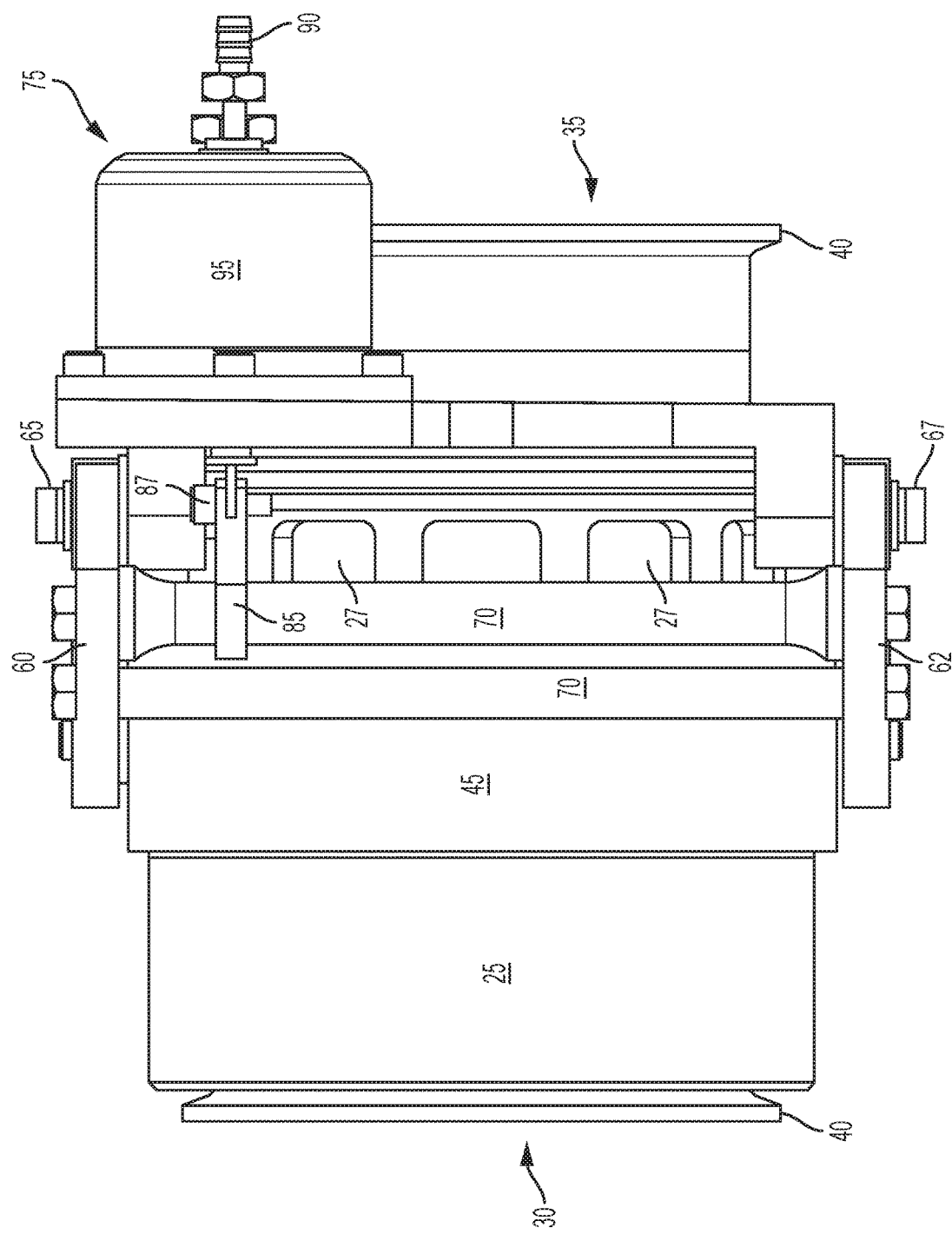
FIG. 8 is a side elevation view of the embodiment of FIG. 1, with the valve in the open position.
Figure 9:
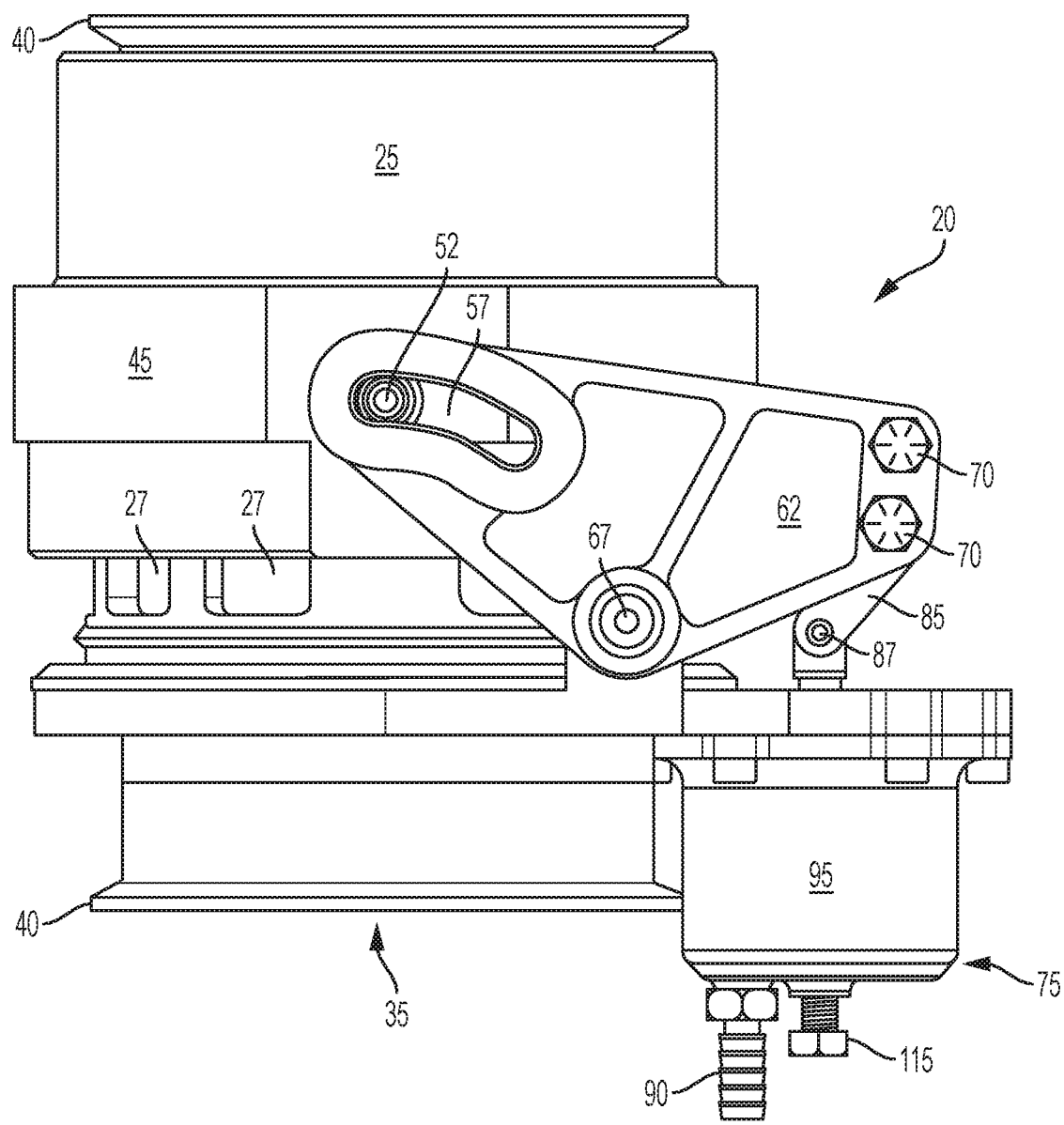
FIG. 9 is a bottom plan view of the embodiment of FIG. 1, with the valve in the open position.

As shown in FIGS. 1, 4 and 5, the pivot plates 60 and 62 are coupled to each other by struts 70. In a preferred embodiment, the PRV 20 employs two struts 70, but it will be appreciated that other embodiments may use only one strut 70, or more than two struts 70. The struts 70 couple pivots plates 60 and 62 together so that both plates move or pivot the same amount. The second pivot plate 62 aids in smooth operation of the PRV 20. However, it will be appreciated that the second pivot plate 62, along with its associated parts, the second pin 52, and second pivot point 67 may be eliminated. In this embodiment of the PRV 20, the struts 70 would also be eliminated, with the pivot link 85 rotatably coupled to the first pivot plate 60.

As shown in the figures, the PRV 20 includes an actuator 75 that is coupled to the hollow body 25. Extending from the actuator 75 is rod 80 that includes a pivot link 85 that is coupled to one of the struts 70. Pivot link 85 is rotatably coupled to rod 80 by a rod pivot 87 so that the pivot link 85 can rotate relative to rod 80. Similar to pivot points 65 and 67, the rod pivot 87 may comprise a fastener and a cylindrical bushing that allow the pivot link 85 to rotate relative to the rod 80.

Figure 10:
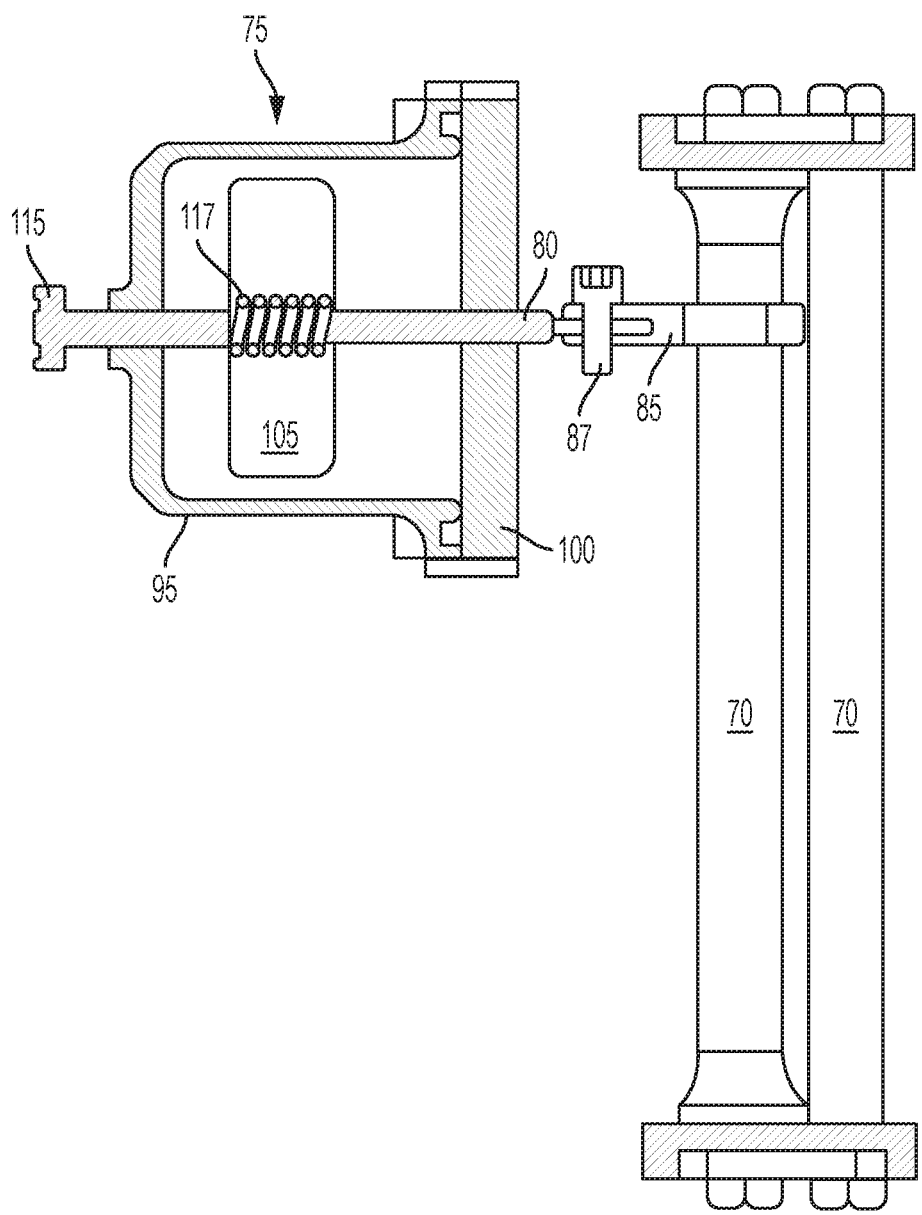
FIG. 10 is a sectional view of the actuator taken along cutting plane A-A of FIG. 3, with the struts also shown.
Figure 11:
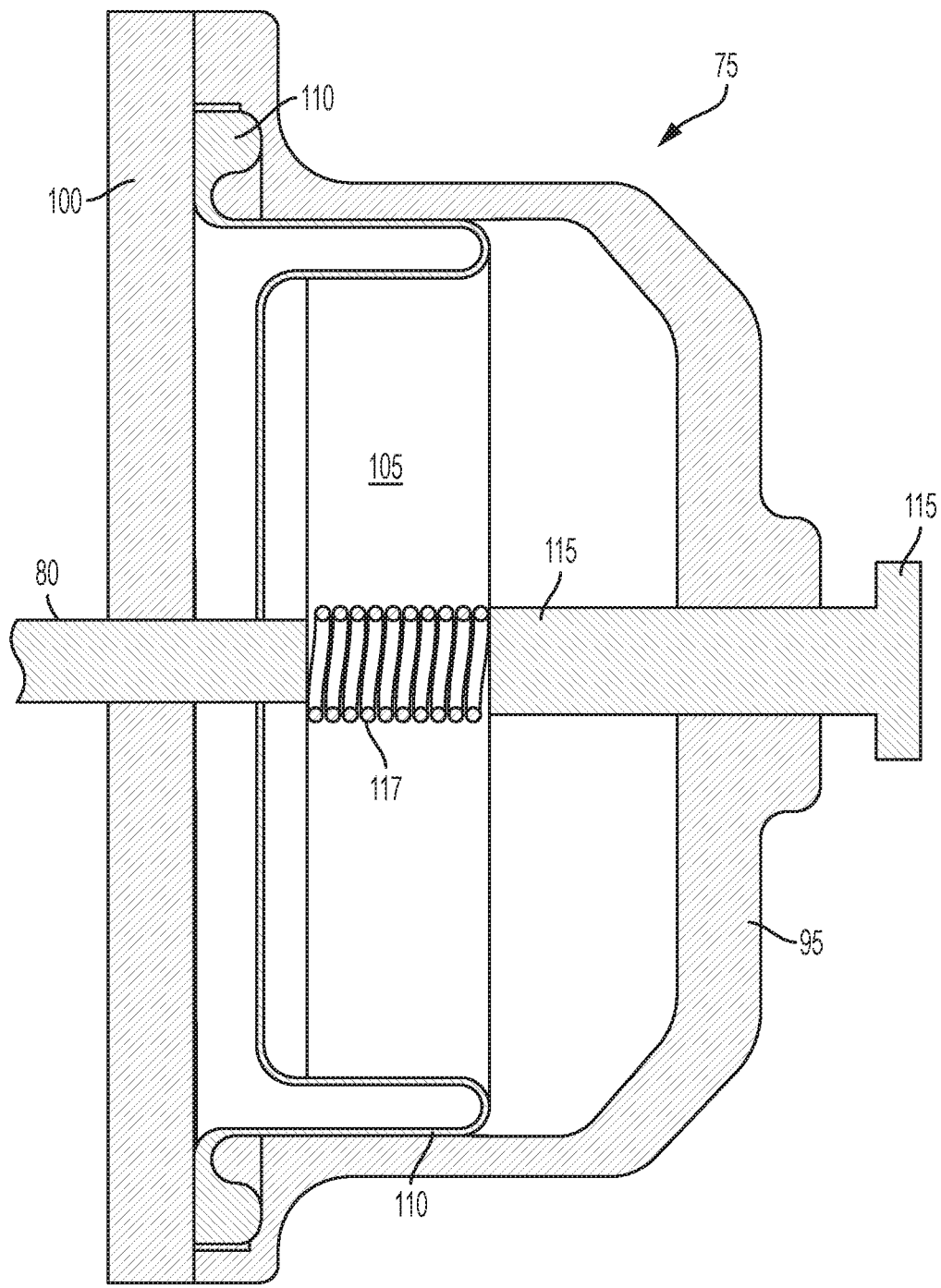
FIG. 11 is a close-up sectional view of the actuator of FIG. 10.

Referring now to FIGS. 10 and 11, the actuator 75 is illustrated in sectional views. In one embodiment, the actuator 75 is driven by a vacuum generated by the intake manifold of an internal combustion engine. As shown in FIGS. 1-9, the actuator includes a vacuum port 90 that is connected by a tube or hose to a similar port on the intake manifold (not shown). In other embodiments, the actuator 75 may include an electric motor that moves rod 80.

As shown in FIGS. 10 and 11, the actuator 75 includes a housing 95 and a back-plate 100 through which the rod 80 extends. Piston 105 is coupled to the rod 80 and diaphragm 110 is located about the piston 105 and rod 80. The diaphragm 110 is shown in FIG. 11 and, in one embodiment, comprises a fabric reinforced rubber diaphragm with a "O-ring" type bead about its circumference (as manufactured by Bellofram Corp., of Newell, W. Va.). This embodiment also includes an aperture through which rod 80 passes. Set-screw 115 extends through housing 95 and abuts piston 105 and may be used to adjust the position of the piston 105 within the housing 95. In one embodiment, the set-screw 115 may be used to adjust a pre-load on the piston 105 and diaphragm 110 so that the PRV 20 may be actuated at different vacuum pressures. Spring 117 abuts the set-screw 115 and piston 105. Rotating the set-screw 115 increases or decreases the force on the spring 117, which enables pre-load adjustment on the piston 105 and diaphragm 110.

Figure 12:
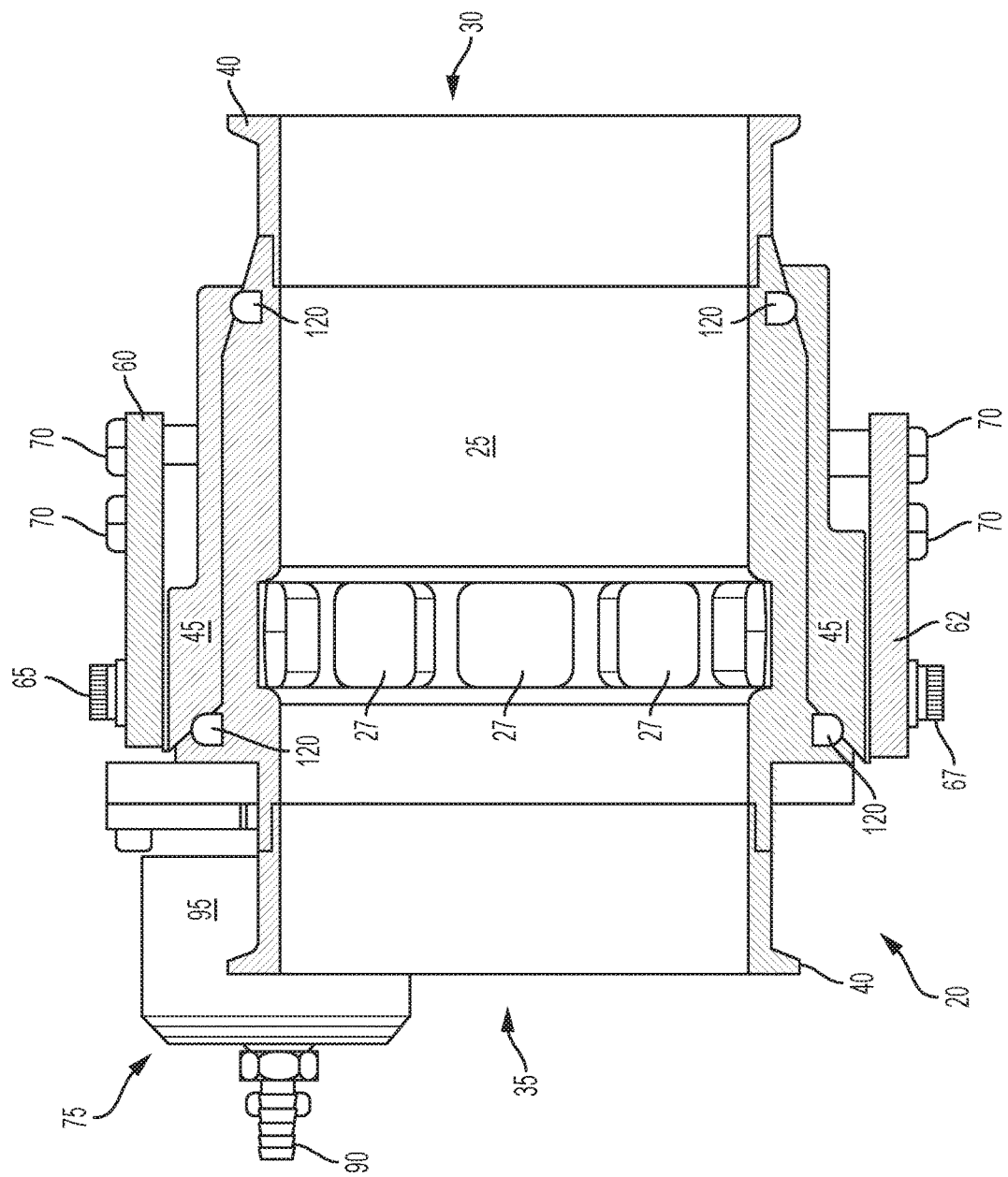
FIG. 12 is a sectional view taken along cutting plane B-B of FIG. 3, with the valve in the closed position.
Figure 13:
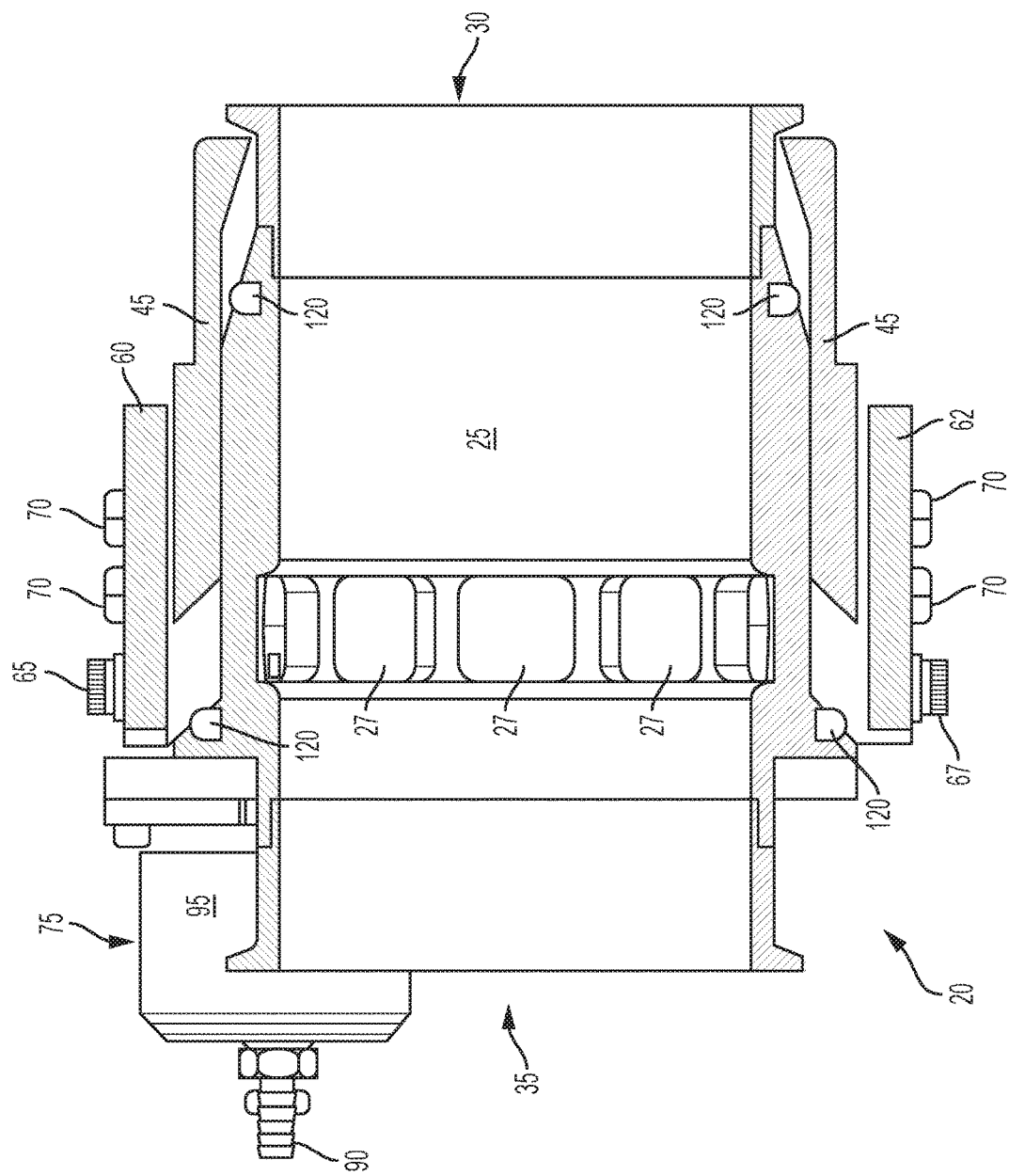
FIG. 13 is a sectional view taken along cutting plane C-C of FIG. 7, with the valve in the open position.

Referring now to FIGS. 12 and 13, the operation of the PRV 20 will be discussed. As mentioned above, the PRV 20 is a pressure relief, or dump valve. Generally, a conventional dump valve employs a vertical and outward moving poppet valve having a spring to keep it closed and a diaphragm actuator to open the valve during engine decelerations when the engine's intake manifold provides a vacuum. One problem with poppet-type valves is that the valve area is used as a control surface that pressure force acts upon and therefore must be compensated for with a spring.

In contrast to conventional poppet-type valves, the PRV 20 of the present invention operates differently. The hollow body 25 is tubular (in one embodiment) and can be placed into the supercharger, or turbocharger ducting in an in-line configuration. The hollow body 25 includes one or more apertures 27, that in the illustrated embodiment, are rectangular. It will be appreciated that the PRV 20 may employ only one aperture 27, or a plurality of apertures 27, that can be of any desired shape. In the illustrated embodiment, the apertures 27 comprise several vents or holes arranged in a band around the body 25 perpendicular to its axis. The tubular sleeve 45 fits externally and concentrically around the body 25. As shown in FIGS. 1-4 (and in sectional view in FIG. 12), in the closed position the sleeve 45 covers the apertures 27 and seals to the body 25 with two round seals, or O-rings 120 (shown in FIGS. 12-13) that are located in grooves in the body 25. In the closed position the sleeve 45 is sealed to the body 25 by the O-rings 120 thus preventing the escape of any fluid or pressure relief.

As shown in FIGS. 5-9, and in sectional view in FIG. 13, to open the PRV 20 and provide pressure relief, the sleeve 45 is moved axially and thus simultaneously unseals from the two O-rings 120 thereby uncovering the apertures 27 allowing fluid flow and pressure relief. Axial movement of the sleeve 45 is provided by the pair of pivoting plates 60 and 62. The pivot plates 60 and 62 are rotated by the rod 80 and pivot link 85 that are connected to the piston 105 and diaphragm 110 that are motivated by actuator 75 that receives a vacuum though the vacuum port 90. As the pivot plates 60 and 62 rotate about pivot points 65 and 67, the slots 55 and 57 in each pivot plate 60 and 62 move pins 50 and 52 that extend from the sleeve 45 to axially move the sleeve 45 from the open to the closed position. In one embodiment, the pins 50 and 52 each comprise a fastener that secures a ball bearing that slides or rotates in slot 55 and 57. The slots 55 and 57 comprise channels or grooves for the ball bearings to provide an axial force to the sleeve 45, which moves the sleeve 45 between the open and closed position.

When the vacuum is removed, the sleeve 45 returns to the closed position, thereby covering apertures 27 and stopping fluid flow. It will be appreciated that the actuator 75 may include an electric motor, instead of the piston 105 and diaphragm 110, to provide actuation.

One feature of the PRV 20 is that there is very little force required to keep the sleeve 45 closed compared to the poppet-type valve. Further, the system pressure (i.e., supercharger or turbocharger boost) no longer plays a significant role in valve operation which greatly improves operation. In addition, the PRV 20 does not depend upon any sliding-ring or lip-type seal. Sealing is only needed and only occurs when the sleeve 45 is in the closed position, so only the two round seals, or O-rings 120 are necessary. Another feature of the PRV 20 is that it provides a large area for fluid to escape. That is, when compared to conventional poppet-type valves, the total area (apertures 27) available for fluid escape is much greater than the area available when a poppet-type valve opens.

Thus, it is seen that a pressure relief valve apparatus, system and method is provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

It is to be noticed that the term "comprising", used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means. Finally, the terms "a", "an" and "the" mean "one or more", unless expressly specified otherwise.

What is claimed is:

1. A valve apparatus, comprising:
    a hollow body having an inlet and an outlet, the hollow body including at least one aperture extending through a surface of the hollow body;
    an actuator assembly coupled to the hollow body; and
    a sleeve slideably positioned about the hollow body, and moveably coupled to the actuator assembly;
    where the actuator assembly is structured to move the sleeve from a first position that covers the at least one aperture to a second position that un-covers at least a portion of the aperture;
    where the actuator assembly further comprises:
    a housing having a diaphragm located within the housing;
    a piston located adjacent to the diaphragm;
    an actuator shaft having a first end coupled to the piston and a second end extending from the housing and coupled to a first strut;
    where the actuator shaft includes a pivot link at a distal end of the actuator shaft, with the pivot link coupled to the first strut and structured to rotate relative to the actuator shaft.

2. The valve apparatus of claim 1, where the actuator assembly comprises:
    a first pivot plate rotatably coupled to the hollow body at a first pivot point, the pivot plate including a slot that is sized to receive a pivot pin that extends from the sleeve.

3. The valve apparatus of claim 2, where the actuator assembly further comprises:
    a second pivot plate rotatably coupled to the hollow body at a second pivot point located opposite the first pivot point, and a first strut coupled to both the first and second pivot plates.

4. The valve apparatus of claim 1, further comprising a second strut located adjacent to the first strut, the second strut coupled to both a first and second pivot plates.

5. The valve apparatus of claim 1, further comprising a first and a second seal positioned about a circumference of the hollow body so that a respective portion of the sleeve abuts the first and second seals when the sleeve is in the first position.

6. A valve apparatus, comprising:
    a hollow body having an inlet and an outlet, the hollow body including at least one aperture extending through a surface of the hollow body;
    an actuator assembly coupled to the hollow body;
    a sleeve slideably positioned about the hollow body, and moveably coupled to the actuator assembly;
    a first pivot plate rotatably coupled to the hollow body at a first pivot point, the pivot plate including a slot that is sized to receive a pivot pin that extends from the sleeve;

a second pivot plate rotatably coupled to the hollow body at a second pivot point located opposite the first pivot point; and
a first strut coupled to both the first and second pivot plates;
where the actuator assembly includes a rod that is coupled to the first strut, so that the actuator assembly can move the sleeve from a first position that covers the at least one aperture to a second position that un-covers at least a portion of the aperture;
where the actuator assembly further comprises:
a housing having a diaphragm located within the housing;
a piston located adjacent to the diaphragm;
an actuator shaft having a first end coupled to the piston and a second end extending from the housing and coupled to the first strut;
where the actuator shaft includes a pivot link at a distal end of the actuator shaft, with the pivot link coupled to the first strut and structured to rotate relative to the actuator shaft.

7. The valve apparatus of claim 6, further comprising a second strut located adjacent to the first strut, the second strut coupled to both the first and second pivot plates.

8. The valve apparatus of claim 6, further comprising a first and a second seal positioned about a circumference of the hollow body so that a respective portion of the sleeve abuts the first and second seals when the sleeve is in the first position.

* * * * *